United States Patent [19]

Benasutti

[11] 4,220,397
[45] Sep. 2, 1980

[54] OPTICAL FIBER CONNECTOR

[75] Inventor: John E. Benasutti, Oil City, Pa.

[73] Assignee: GTE Products Corporation, Stamford, Conn.

[21] Appl. No.: 939,083

[22] Filed: Sep. 1, 1978

[51] Int. Cl.² .............................................. G02B 5/14
[52] U.S. Cl. ................................................. 350/96.21
[58] Field of Search ............... 350/96.20, 96.21, 96.22

[56] References Cited

U.S. PATENT DOCUMENTS

| 3,885,859 | 5/1975 | Dalgleish et al. | 350/96.21 |
| 4,088,386 | 5/1978 | Hawk | 350/96.21 |
| 4,102,561 | 7/1978 | Hawk et al. | 350/96.21 |

FOREIGN PATENT DOCUMENTS

| 2518319 | 7/1976 | Fed. Rep. of Germany | 350/96.21 |
| 2742084 | 3/1978 | Fed. Rep. of Germany | 350/96.21 |

Primary Examiner—Stewart J. Levy
Attorney, Agent, or Firm—Robert E. Walter; Donald R. Castle

[57] ABSTRACT

A fiber optical connector includes a pair of fiber supporting members each having at least one axially aligned channel for accommodating the fiber. A fiber holding member is associated with each supporting member and includes at least one projection for engaging a fiber within respective channel. The holding and supporting members form an integral assembly for holding the fibers with the ends thereof projecting a predetermined distance from the end of respective channels. A separate fiber receiving member includes a fiber junction region having at least one channel therein of sufficient length to hold said projecting fibers in end to end relationship. A U-shaped transversely displaceable member is provided for engaging and securing respective fiber tips at the junction of the fibers within said channel. The respective channels of the supporting members are inclined downwardly in an axial direction toward the channel at the junction region whereby a bend in the respective fibers tend to urge the fibers toward the bottom of the channel. Each supporting member and the receiving member include complimentary means for attaching the supporting members in opposed assembled relationship to the fiber receiving member and axially aligning the respective channels whereby a continuous optical path is provided.

14 Claims, 4 Drawing Figures

OPTICAL FIBER CONNECTOR

FIELD OF INVENTION

This invention relates generally to optical fibers and more specifically, to connectors for coupling individual or a plurality of fibers.

There are many advantages to transmitting light via optical fiber wave guides. Single fiber wave guides may be used simply for transmitting visible light to a remote location. Complex communication systems may transmit multiple specific optical signals. These devices often require the coupling of fibers in end to end relationship. The coupling is a source of signal loss with axial alignment representing a particularly serious problem.

Whether single fibers are placed in end to end relationship or multiple wave guides of connecting cables are junctioned, it is desirable to have a connector that can quickly and efficiently place the appropriate fiber ends in abutting relationship while minimizing angular misalignment.

PRIOR ART

U.S. Pat. No. 3,919,037 to Miller discloses an optical fiber splicing apparatus wherein the arrayed pairs of optical fibers are introduced into opposite ends of an elongated optical fiber receiving cavity.

U.S. Pat. No. 3,885,859 to Dalglesish et al discloses a connector comprising two holding members wherein one holding member has a "V" groove. As the two holding members are brought together in assembled position the fibers are brought into end-to-end relationship over the shaped groove. A resilient member pushes the ends of the fibers down into the groove to give accurate end-to-end alignment.

U.S. Pat. No. 4,045,121 describes a connector including a section having an inclined surface engaged by the ends of the fibers. The fibers are bent by the surface as connector sections are mated.

U.S. Pat. No. 3,914,880 describes a connector having two external surfaces which are accurately finished and mated. A machined hole permits the pair of connectors to be accurately aligned.

U.S. Pat. No. 3,948,582 discloses an optical fiber connector with separately formed bodies of substantially elongated form, each body has an axial bore in which the optical fiber can be fitted. The end of one body defines a socket adapted to mate with the plug shaped end of the second body.

SUMMARY OF THE INVENTION

It is desirable that optical fiber connectors be of simple construction and easily assembled in addition to providing an accurate interconnection between the fibers.

According to the principles of the present invention, there is provided a connector for holding the ends of optical fibers in end to end relationship comprising a pair of fiber supporting members, each supporting member having at least one axially aligned inclined channel for accommodating a fiber, means for holding said fibers with the ends thereof projecting a predetermined distance from the end of said channel, a separate fiber receiving member having a fiber junction region including at least one channel of sufficient length and having a level section for holding said projecting fibers in end to end relationship, means for attaching said supporting members in opposed assembled relationship to said fiber receiving member and axially aligning the respective channels of said supporting member at either end of the channel of said receiving member, said respective incline channels of said supporting members being inclined downwardly along an axial direction toward said channel at the junction region for urging the fibers downwardly into the level section of said channel, and a transversely displaceable member for engaging respective fiber tips of abutting fibers within said channel of said receiving member.

DETAILED DESCRIPTION OF A PREFERRED EMBODIMENT

Figure 1:
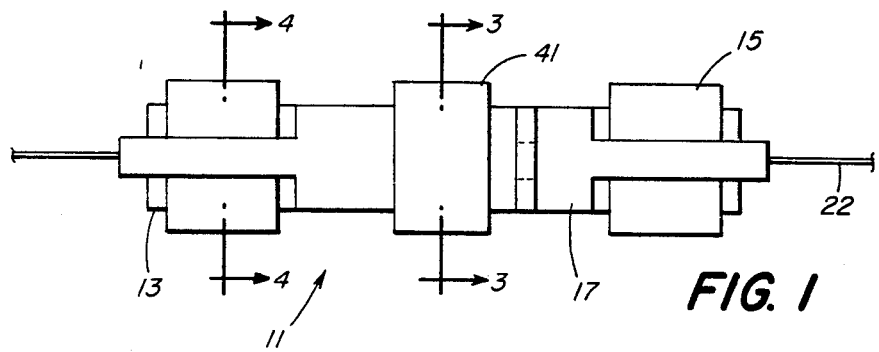
FIG. 1 is a side elevational view of the connector assembly.

As illustrated in FIG. 1, the connector assembly 11 includes a pair of fiber supporting members 13 each having a fiber holding member 15 mounted thereon so as to hold the fibers with their tips or ends projecting a predetermined distance therefrom. The pair of supporting members 13 are attached to either side of a receiving member 17 so as to form an integral connector assembly 11.

The fiber supporting member 13 is of rectangular shape with a channel 21 in the top surface thereof for supporting fiber 22. The fibers typically used for a communication system have a silica core of one refractive index and a silica cladding or coating of another generally lower refractive index. An additional outer coating is generally of plastic material which improves the mechanical handling characteristics of the fiber. Channel 21 is axially aligned and is generally V-shaped so that the walls of the channel act as guides to align and properly seat the fiber 22 in the channel 21. Due to the V-shaped configuration of the channel 21, fibers of various diameters can be accommodated therein.

A fiber holding member 15 is of general U-shaped configuration and includes a bridging section with depending side sections. A projection 23 is positioned intermediate the side sections on the interior surface of the bridging section and faces channel 21 and the top surface of supporting member 13. The projection 23 which is generally of a V-shaped configuration so as to conform with the configuration of channel 21 includes a base 24 which engages the fiber. The pressure exerted by the projection 23 on the fiber is sufficient to secure the fibers 22 against movement but incapable of damaging them due to the protective nature of the resilient material and the configuration of the projection 23 which tends to distribute a holding force on the fiber. For extremely fragile fibers, the projection 23 can be made to extend along the channel 21 in an axial direction greater than would normally be utilized so as to distribute the pressure exerted against the fiber over a greater area.

Means are provided for securing the holding members 15 to respective supporting members 13 so that the projections are resiliently urged into engagement with the fiber 22 within the channel 21. Each of the side sections of the U-shaped holding member 15 include a flange extending inwardly from the end of each respective side section. The flanges 25 provide for a gripping engagement with the supporting member 13. The side sections are outwardly yieldable for placing U-shaped holding member about the supporting member 13 and inwardly springable to engage the bottom surface of the supporting member 13. The inward extension of the flanges 25 is at an acute angle with respective side sections. The flanges 25 are cantilevered so as to exert a force in the transverse direction on the side sections which is in turn transmitted to the projecting member 23 so as to exert a holding force on the fiber 22. The side surfaces of the supporting member 13 include recesses for accommodating the side sections of the U-shaped holding member 15 so as to prevent movement thereof in an axial direction. The side sections are confined in the recesses 27 and substantially conform to the sides of the supporting member 13.

A fiber receiving member 17 is provided which is separate from either of the supporting members 13. The receiving member 17 includes the fiber junction region 29 where the ends of the fibers to be spliced are held in axial alignment and in end to end relationship. To obtain accurate alignment of the fiber ends it is generally desirable to remove the outer coating from the fiber at this juncture. It can be done, for example, with a chemical solvent. It is also desirable to prepare the end of the fiber by polishing or suitable breaking technique to produce a smooth end surface perpendicular to the longitudinal axis of the fiber. The channel 31 in the junction region 29 is sized for accommodating bared fiber wave guides therein. The channel 31 is substantially of a V-shaped configuration so that fibers of various sizes can be accommodated and holding pressures can be distributed about the exterior of the fiber. A transversely displaceable member 41 is provided for engaging respective fiber tips of the junctioned fibers within the channel 31 and securely aligning and holding the ends or tips of the junctioned fibers. Any axial misalignment of the junctioned fibers can result in significant transmission loss. Loss can be minimized by employing an index matching fluid at the junction of the fibers to eliminate any air gap therebetween.

The transversely displacing member 41 is similar in construction to the holding member 15 as hereinbefore discussed. The features of holding member 15 are common to both members unless otherwise indicated. The projection 43 of the transversely displacing member 41 which is adapted to engage the abutting fibers within the channel 31 contacts the bared fiber wave guide. The base portion of the projecting member 43 is similar to the base portion 24 of the projecting member 23. It is desirable to form the projection 43 from a resilient material such as polypropylene or polyethylene, which deform slightly when pressing contact with the bare wave guide tips is made. The transversely displacing member 41 is generally U-shaped configuration and includes a bridging section 49, side sections and flanges that are similar to the hereinbefore parts of the holding member 15.

The transversely displacing member 41 is placed about the receiving member 17 whereby the side sections yieldably expand and the flanges make contact with the bottom surface receiving member to hold the member 41 in place. The side sections fit within recesses in the sides of the receiving member 17.

The transversely displaceable member 41 includes a projection 43 intermediate a bridging section 49 and respective side sections. The inwardly facing surface of the bridging section 49 is spaced from the top surface of the receiving member 17. The section 49 is sufficiently flexible to permit displacement of the flanges beyond the bottom surface of the receiving member 17. During installation of the member 41, the ends of the bridging section 49 can be deflected downwardly to permit the side sections and flanges to resiliently bias inwardly to grip the bottom surface of the receiving member 17. The downward pressure exerted on the bared fiber can be controlled thereby reducing potential damage to the bared fiber that may be caused by too great of a downward pressure. Once the member 41 is in position, the cantilevered spring effect of the flanges is balanced by the cantilevered spring effect of the bridging portion so that the desired amount on force on the bared fibers can be regulated by proper selection of the materials and the thickness of the materials used in the bridging and flange portion of the member 41. The bridging portion should be sufficiently flexible to permit displacement of a flange beyond the bottom surface but sufficiently inflexible to provide at least some resistance to the cantilevered force of the flanges. It is also contemplated that the holding members 15 may have this similar feature.

It is desirable that the fibers project a given distance from the end surface of respective supporting members 13 or the ends of channels 21 thereof. This can be done by any method known in the art. The holding member can be placed in a jig with the fibers extending greater than the desired distance and cleaved so that the fibers extend a predetermined desired distance. The fiber coating can also be removed by a method hereinbefore discussed. The supporting members 13 with the bared fibers projecting a predetermined distance from the end of respective channels 21 are assembled in opposed relationship to the fiber receiving member 17 whereby respective channels of the supporting members 13 are axially aligned at either end of the channel 31 of the receiving member 17.

Figure 2:
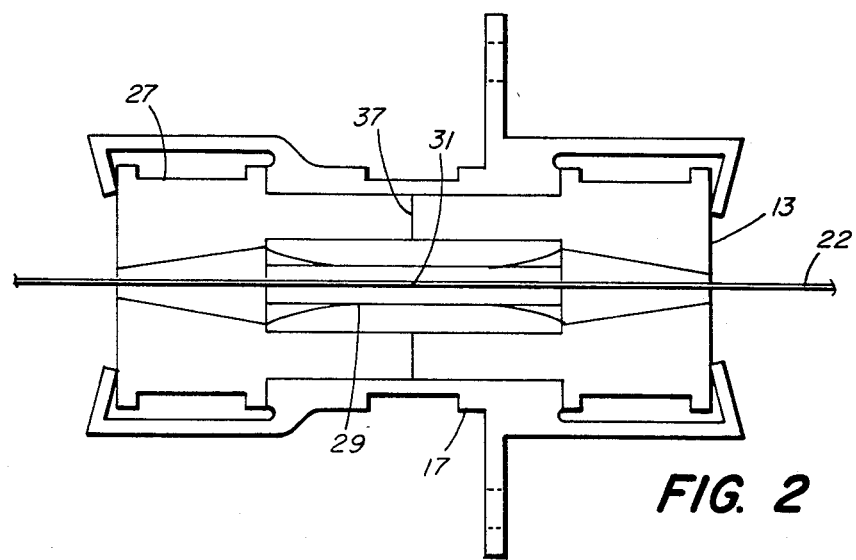
FIG. 2 is a top elevational view along section 2—2 of FIG. 1.
Figure 3:
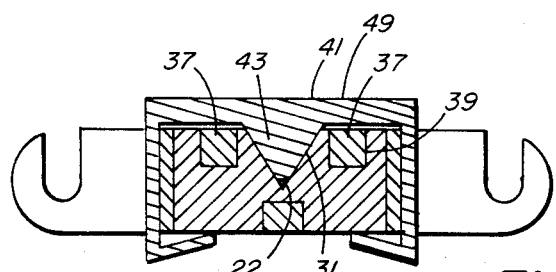
FIG. 3 is an end elevational view along section 3—3 of FIG. 1.
Figure 4:
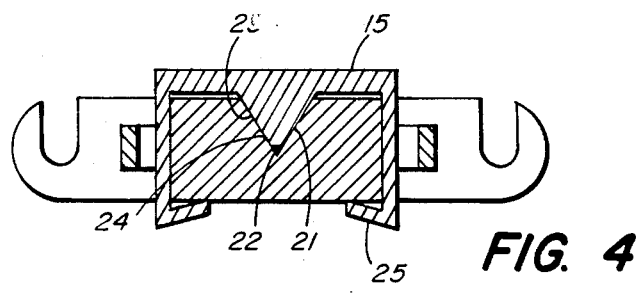
FIG. 4 is an end elevational view along section 4—4 of FIG. 1.

The supporting members 13 and the receiving member 17 include complimentary means for retaining and supporting these members in axial alignment. As illustrated in detail in the drawing, the complimentary retaining means comprises mating surfaces associated with respective supporting members 13 and the retaining member 17. A plurality of prongs 37 are provided on each of the supporting members 13. The prongs 37 mate with receptacles 39 having openings at either end of the receiving member 17. As illustrated in FIG. 2, the receptacles axially extend through the receiving member whereby the opposing prongs 37 of the supporting members 13 abut within the receiving member 17. With this construction the bare fibers are cut at a predetermined distance, preferably slightly shorter than the length of the prongs 37 so as to ensure a small gap between the fiber ends and to compensate for fiber length due to fiber bending. When the supporting members 13 are inserted into either side of the receiving member 17, the respective ends of the prongs 37 abut to result in the fibers being inserted into channel 31 a predetermined distance.

The V-shaped channel 21 of each of the fiber supporting members 13 is inclined downwardly along the axial direction from one end to the other end which is adjacent to the fiber receiving member 17. In the finally assembled connector 11, the abutting fibers lie in a substantially common plane. The depth of the V-shaped channel 31 of the receiving member 17 is substantially the same depth along the center portion thereof with the bottom of the V-shaped channel 31 lying in a substantially level horizontal plane. The bottom of the V-shaped channels 21 of the supporting members 13 lie in horizontal planes which are inclined downwardly toward the receiving member 17 so that the depth of the channels 21 at the end of channel 21 is lesser than the depth of the channel 31 at the fiber junction area 29. As a result of this construction, the ends of the fibers in the assembled connector 11 are deflected upwardly or bent against the material beam strength of the fiber which tends to urge the fiber downwardly into the V-shaped channel 31. It has been found that for fiber channel 21 of about a three (3) degree slant from the horizontal, the bottom of the V-groove should be about ten thousandths of an inch above the bottom of the V-shaped channel 31 junction area at the channel 21 end region adjacent to channel 31. The downward slant of the V-groove of the channels 21 are preferably at an angle from about 2 to 5 degrees. This angle imparts a bend to the fiber which is generally sufficient to urge the fiber toward the bottom of the groove of the receiving member. It is desirable to maintain this angle as small as possible to prevent scarifying or breaking of the fiber during insertion of the fiber into channel 31 and limit light loss due to bends in the fiber.

In a preferred embodiment, it is desirable to have the ends of the channel 31 slope downwardly from a level center section in the fiber junction area 29. The bottom of the channel 31 at the ends thereof should be slightly below the end of the downwardly projecting fiber so that the end of the fiber first contacts the downward sloping section of channel 31 and rides upwardly to the level portion or junction area 29 as the supporting member 13 is inserted into the receiving member 17. It has been found that an eight (8) degree slope is sufficient.

The receiving member 17 includes bifurcate extentions at either end thereof for accommodating respective supporting members 13. Each of the bifurcate extentions include inwardly projecting flanges for engaging the end surfaces of the holding member 15. The bifurcated extentions extend adjacent to an exterior of the holding member 15. Due to the snap lock type fittings, the connector assemblies easily assemble and the resulting assembly is an integral body with connecting parts.

To assemble the connector, the ends of the fibers to be junctioned, cleaved and with fiber coating removed, are placed in the appropriate supporting members 13 with the fiber ends projecting outwardly adjacent to prongs 37. The fiber ends are appropriately adjusted so that they project a distance from the end of the channels 21 preferably slightly shorter than the length of the prongs 37. The holding members 15 are snapped into place. The fiber and the supporting members 13 are plugged into the ends of the receiving member 17 whereby the fibers are in axial alignment and junction at the center of the channel thereof. An index matching fluid can be placed over the junctioned ends at this time. The transversely displaceable member 41 is then snapped into place about the receiving member.

What is claimed is:

1. A connector for holding a pair of optical fibers in axial alignment along an axial direction with the ends of the optical fibers in end relationship comprising a pair of fiber supporting members, each member having at lease one axially aligned inclined V-shaped channel for accommodating the fiber, means for holding said fibers with the ends thereof projecting a predetermined distance from the end of a respective inclined V-shaped channel, a separate fiber receiving member having a fiber junction region including at least one V-shaped channel of sufficient length having a level section at the junction region for supporting said projecting fibers in end to end relationship, said respective inclined V-shaped channels of said supporting members being inclined downwardly along an axial direction toward said junction region for urging the fibers downwardly into the level section, said receiving member having a receptacle portion, each of said supporting members having an end surface and a pair of prongs protruding outwardly therefrom in an axial direction, said respective prongs of one supporting member being in abutting relationship within said receptacle with respective prongs of the other supporting member whereby said supporting members are positioned in opposed assembled relationship to said fiber receiving member with said respective inclined channels being aligned with said level section of said channel on either side thereof, and a transversely displaceable means for engaging respective fibers within said level section of said V-shaped channel.

2. A connector according to claim 1 wherein said incline channels slope downwardly toward the fiber junction area at an angle from about 2 to about 5 degrees.

3. A connector according to claim 2 wherein said V-shaped channel slopes downwardly from either side of said level section.

4. A connector according to claim 1 wherein said fiber receiving member comprises an elongated housing having top and side surfaces, said transversely displaceable means being U-shaped and having side sections and a bridging section, a projection being intermediate said side sections on said briding section, said side section substantially conforming to said side surfaces and including means for grippingly engaging said receiving member.

5. A connector according to claim 4 wherein said grippingly engaging means comprises a pair of flanges extending inwardly from said side sections, said flanges and side sections being outwardly yieldable.

6. A connector according to claim 5 wherein said receiving member includes a bottom surface, said flanges being adapted to spring inwardly to engage said bottom surface.

7. A connector according to claim 6 wherein said flange normally extends inwardly at an acute angle with said side sections, said flanges having ends engaging the bottom surface, said bridging section having portions facing said fiber junction region adjacent said side sections, said portions being spaced from said fiber junction region and being sufficiently flexible whereby the ends of said flanges may be displaced beyond the bottom surface.

8. A connector according to claim 7 wherein said projection is urged into said channel by a cantilever spring effect of said flanges and wherein said bridging portion is sufficiently inflexible to substantially resist said cantilever spring effect.

9. A connector according to claim 4 wherein the prongs of each supporting member project outwardly substantially equidistance from respective end surfaces of said supporting members.

10. A connector according to claim 4 wherein said holding means comprises U-shaped members having side sections and a bridging section, said projection being intermediate said side sections and including means for grippingly engaging said respective, supporting members.

11. A connector according to claim 10 wherein said grippingly engaging means includes a pair of flanges extending inwardly from said side sections, said flanges and side sections being outwardly yieldable for placing said U-shaped section about said holding member and inwardly springable for gripping said holding means.

12. A connector according to claim 11 wherein said receiving means includes bifurcate extension of said fiber receiving member at either end thereof for engaging respective holding members.

13. A connector according to claim 12 wherein each of said bifurcate extensions include inwardly projecting flanges, said holding members each having another end surface, said inwardly projecting flanges engage said other end surface for holding said fiber holding means in axial alignment with said fiber receiving means.

14. A connector according to claim 13 wherein said bifurcated extensions engage the side sections of said U-shaped member to form a unitary connector assembly.

* * * * *